(12) United States Patent
Temple

(10) Patent No.: X5751
(45) Date of Patent: Dec. 11, 1829

(54) GRIST MILL, & SPRIAL WATER WHEEL

(76) Inventor: Alexander Temple

Alexander Temple – Brookfield, Ohio.
Letters Patent.
Dated December 11th 1829.

The Schedule referred to in these Letters Patent & making part of the same,
containing a description in the words of the said Alexander Temple himself, of
his improvement in the Grist Mill, & horizontal Spiral Water Wheel.

---

Be it known that I, Alexander Temple of Brookfield, in the .... County of
Trumble, & State of Ohio, have invented a new & useful improvement in the Grist Mill
which is described as follows, viz:

1st The improvement consists of three stones, two bed or fast stones let into Timbers
or Bearers, the one made fast to the frame; the other to move on grooves on the side girts
of the frame. The runner is in the form of a double cone, with a mandril or spindle
passing the bed stones & bearers on which the runner is made fast with two choppers or
breakers at each end of the runner say 2½ or 3 in. in diameter to be of steel or other me-
tal which works in the bed stones, or in steel or other metal, the choppers or conveyers to
the runner may be larger at the end adjoining the runner with spiral lines to break
& convey the grain to the runner, & bed stones to be dressed with spiral lines, say 6 or
7 leading furrows for a stone one foot four inches, with a draft of one inch at the centre, &
lined as other mill stones with Quarter Dress. The stones are moved by bolts with screws
& burr-wrench which passes thro' the bearers & end of the frame to close them to the
runner . .

2nd The mandril or spindle to be made of Iron, say one inch & a half in diam-
eter, with squares to fasten the pulley & choppers, cams &c. with the ends of steel, where
it meets the tempering screws. The grain which passes from the hopper by shoes moved
moved by rods through the bottom of the shoes down below the oval cams on the man-
dril is conveyed to the centre of the choppers at the end of the runner by a passage in the
bed stones, where it joins the bearers or Timbers.

Two temporary screws or levers may be applied for setting back the portable bed
stone if required.

The curb or hoop for confining the flour around the stones, may be made of sheet
Iron, having a vacancy for the meal spout, the full space between the fast stones, which
is the straight part of the runner. This mill is intended to grind all kind of grain, working from the centre, with two feeders from one hopper. The revolution of the stone is thought best at 250 revolutions in a minute.

The horizontal Spiral Water-Wheels with its forebay, directors & shoots are as follows viz: The wheel or block to be about 3 inches on its edge & raised at the shaft in the form of a cone. the buckets to be 12 inches wide in a circular form placed on an angle of about 60 degrees, the circle larger below, extending so far as to make the Issues 2 inches wide on a wheel for 1/2 foot head of water, the issues reduced as the head may be, 1/8 of an inch to every additional foot of head for 6 feet. above 6 feet reduce the buckets in width; the wheel to be about 4 ft. in diameter, motion about 68 revolutions in a minute, when applied to a horizontal run of stones in common mills.

The geering to be the same as in other mills & the mill may be moved by water, steam, or Animal power.

What I claim as my invention & which I wish to secure by Patent is

1st The double conical stone, or other materials, with the two breakers working into corresponding hollow cones or cone.

2nd. The improvement in the water wheels before described: that is in the manner of shaping & placing the buckets on the horizontal wheels, with the manner of letting the water on & off the wheel, preventing the ill effects of back water.

3d In the manner of moving the damsel or shaking rod by means of an oval cam placed on the mandril or spindle.

Witnesses
E. K. W. Wharton
L. S. Beck

Alexander Semple (742 words)

Exd
W.G.C.